United States Patent
Andler

(10) Patent No.: US 9,611,889 B2
(45) Date of Patent: Apr. 4, 2017

(54) METHOD FOR PRODUCING BEARING SHELLS OF PLAIN BEARINGS

(75) Inventor: Gerd Andler, Bad Schwalbach (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 48 days.

(21) Appl. No.: 14/363,947

(22) PCT Filed: Aug. 17, 2012

(86) PCT No.: PCT/EP2012/066113
§ 371 (c)(1),
(2), (4) Date: Jun. 9, 2014

(87) PCT Pub. No.: WO2013/083302
PCT Pub. Date: Jun. 13, 2013

(65) Prior Publication Data
US 2015/0219155 A1    Aug. 6, 2015

(30) Foreign Application Priority Data

Dec. 7, 2011  (DE) .................. 10 2011 087 880

(51) Int. Cl.
*F16C 33/02* (2006.01)
*F16C 33/14* (2006.01)
*B24C 1/10* (2006.01)
*F16C 33/12* (2006.01)
*C22F 1/04* (2006.01)

(52) U.S. Cl.
CPC ............. *F16C 33/14* (2013.01); *B24C 1/10* (2013.01); *C22F 1/04* (2013.01); *F16C 33/122* (2013.01); *F16C 33/125* (2013.01); *F16C 2202/04* (2013.01); *F16C 2204/22* (2013.01); *Y10T 29/49707* (2015.01)

(58) Field of Classification Search
CPC ...... F16C 33/122; F16C 33/125; F16C 33/14; F16C 2202/04; F16C 2204/22
See application file for complete search history.

(56) References Cited

U.S. PATENT DOCUMENTS

| 5,458,984 A * | 10/1995 | Negwer ................. F16C 33/12 427/448 |
| 6,103,395 A | 8/2000 | Andler et al. |
| 2008/0085421 A1 | 4/2008 | Oguri |
| 2014/0238321 A1 * | 8/2014 | Lettmann .............. B23P 11/025 123/90.1 |

FOREIGN PATENT DOCUMENTS

| DE | 259021 A1 | 8/1988 |
| DE | 37 15 323 A1 | 12/1988 |
| DE | 10 2005 023541 A1 | 11/2006 |
| DE | 10 2005 055708 A1 | 5/2007 |

(Continued)

*Primary Examiner* — James Pilkington
(74) *Attorney, Agent, or Firm* — Robert L. Stearns; Dickinson Wright, PLLC

(57) ABSTRACT

The present invention relates to a method for producing bearing shells of plain bearings, in which the bearing shells are blasted with corundum particles on the bearing metal side, in order in this way to produce residual compressive stresses in the blasted side of the bearing shell. Furthermore, the present invention relates to a bearing shell produced using such a method.

11 Claims, 2 Drawing Sheets

(56) References Cited

FOREIGN PATENT DOCUMENTS

| | | |
|---|---|---|
| DE | 10 2007 028888 A1 | 1/2009 |
| DE | 10 2007 042833 A1 | 3/2009 |
| JP | H09217747 A | 8/1997 |
| JP | H11229060 A | 8/1999 |
| JP | H11293435 A | 10/1999 |
| JP | 2000507305 A | 6/2000 |
| JP | 2003113838 A | 4/2003 |
| JP | 2006188720 A | 7/2006 |
| WO | WO 2010/017984 A1 | 2/2010 |

\* cited by examiner

METHOD FOR PRODUCING BEARING SHELLS OF PLAIN BEARINGS

BACKGROUND OF THE INVENTION

Technical Field

The present invention relates to a method for producing bearing shells of plain bearings. It also relates to a bearing shell produced by using such a method.

It is known that two-component aluminum bearing shells used in engines of motor vehicles, for example, are subject to fatigue. Such bearing shells consist of a steel back and a bearing metal layer applied thereto by means of a roll bonding process, which can consist of an aluminum-tin alloy, for example. A further intermediate metallic layer can be inserted between the steel back and the bearing metal layer in order to improve the mechanical properties of the bearing shell.

However, due to the production process of such a composite material and also due to the mechanical properties of the bearing metal, the bearing shells configured in this way are restricted in their stress capacity to loads in the engine of up to approximately 70 MPa.

To generate increased fatigue strength in shafts, gear wheels, springs or also connecting rods, the surfaces thereof are bombarded by steel, ceramic and/or glass beads in accordance with the state of the art (so-called "shot blasting"). By this, compressive residual stresses are generated in the near-surface area, which lead to increased fatigue strength by strain hardening.

Related Art

DD 259 021 A1 discloses a journal bearing of reciprocating compressor driving gears. Here, a journal bearing designed as a composite bearing is described, which is configured with regard to the geometry thereof such that a defined compressive pretension develops in the sliding layer by installation into a housing and the consequential deformation. By this, the resilience of the bearing can be increased.

Alternatively, DE 10 2007 028 888 A1 discloses the targeted mechanical strain hardening of areas of a crankshaft, i.e. a component supported by a bearing, in order by this to increase the strength of this component. This effect is therefore substantially similar to that of DD 259 021 A, however with this effect relating to the strain hardening of a component supported by a bearing (in contrast to a bearing shell).

DE 10 2005 055 708 A1 relates to a method for forming cavities by blasting abrasive particles.

SUMMARY OF THE INVENTION

The present invention is directed at developing a method for increasing the fatigue strength of the bearing metal of plain bearing shells.

Accordingly, a bearing shell finished in other respects is blasted with particles of corundum on the bearing metal side, i.e. the side of the bearing shell that during use abuts the component supported by the bearing. Preferably, a blasting corundum is used here, which consists of 80-99% aluminum oxide. The hardness thereof according to the Mohs' scale is close to 10. In particular, in bearing shells which are usually curved, the "bearing metal side" is the concave side. By blasting, compressive residual stresses are generated in the blasted material of the bearing shell. by such a method, the bearing shell on the plain bearing side, i.e. substantially the bearing metal of the bearing shell, is compressed by the impact of the particles. The particles hit the surface and are reflected by this. By this, they release at least some of their impulse and kinetic energy to the bearing shell, which compresses the material thereof near the surface. Moreover, stresses are locally built up in the bearing metal, while the surface roughness of the bearing metal is slightly increased at the same time. By the compressive residual stresses generated due to the blasting, the fatigue strength of the bearing shell is increased.

A particular advantage of blasting by corundum results from the high hardness thereof (Mohs' hardness 9). By this, the particles are only slightly deformed upon the impact on the bearing, which in particular leads to the advantage that the particles can transfer a considerably larger amount of their kinetic energy to the bearing shell than would be the case with less hard particles, which leads to an improved hardening of the processed bearing shell. One advantage of using blasting corundum is the wear resistance thereof, i.e. it can easily be used again.

It is preferred that a pressure of between 2.5 and 5 bar is used for blasting the particles against the bearing metal. The aforementioned pressure is the pressure at which air (or another gas) is fed into the nozzle containing the corundum. By this, a particularly good surface compression is achieved, by which compressive residual stresses can be generated very efficiently, while in turn the pressure is low enough to avoid damage to the bearing shell or a too rough surface roughness due to an excessively high impact velocity of the particles.

Preferably, the bearing metal in the near-surface area has a hardness when not blasted of approximately 115 Hv 0.01 or less, whereas the bearing metal in the blasted area has a hardness of approximately 130 Hv 0.01 or more. This corresponds to an increase of the hardness by more than 10%, i.e. by approximately 13%, in relation to the hardness of the not blasted area. By this, a considerably increased strength of the bearing metal results from the blasting, without it being necessary to use another, less cost-efficient material as the bearing material.

Moreover, it has proved to be advantageous that the bearing shell consists of two or more layers. This has the advantage that the positive properties of several materials can be combined here. In particular, a metal can, for example, be used as the bearing metal, which is characterized by high surface strength and fatigue strength, while a material as hard as possible and with a service life as long as possible is used for the base material.

Furthermore, it is preferred that an aluminum alloy, preferably an aluminum-tin alloy, is used as the bearing metal, and that the bearing metal is preferably applied onto a steel back by roll cladding. The advantage of using an aluminum alloy as the bearing metal is that this material, in particular an aluminum-tin alloy, has good properties as a bearing metal and is also well-defined. Moreover, the processes for producing the composite material, i.e. the band, as well as for producing the bearing shells and the surface treatment thereof, are known and mastered.

It is advantageous that the bearing metal is applied onto a steel back by roll cladding since this is a cost-efficient method characterized by a good connection between the steel back and the plating material, while steel is characterized by high strength, simple processability and low costs. Furthermore, it has turned out that it has advantages if the bearing shell consists of three layers, with the middle layer preferably consisting of high-grade aluminum or an aluminum alloy having few alloy elements of Mn, Cu, Ni and/or Si. Such alloyed intermediate layers are used in cases where particularly high requirements are placed on fatigue strength. In particular, the intermediate layer also contributes to an improved connection between the bearing metal and the base metal.

The present disclosure also relates to a device comprising one or several holders for one or several bearing shells and one blasting device suited to blast corundum against the bearing shell(s) held in the holder(s). This is advantageous in that it makes it possible to perform a method having the advantages mentioned herein. Moreover, by having a specific device for carrying out this method, a higher efficiency can be achieved than when such a device is not available.

DETAILED DESCRIPTION OF A PREFERRED EMBODIMENT OF THE INVENTION

A bearing shell having a bearing metal layer of AlSn, which is described further below, is blasted in a blasting device for bearing shells, described further below, having corundum particles emerging from a nozzle. Here, the nozzle is connected to an air supply means, such as for example a blower, which releases the air at an air pressure of between 2.5 and 5 bar, preferably 3.0 to 4.0 bar. The corundum particles are fed into the nozzle, carried along by the air flow and thereafter blasted by the air flow against the bearing shell. The particles blasted against the bearing shell have an average diameter of 10 to 60 μm.

The corundum particles hit the bearing metal of the bearing shell arranged substantially perpendicular to the blasting direction, with, of course, every other angle between the blasting direction and the bearing shell being conceivable. The bearing shell is held during treatment substantially stationary in relation to the beam of corundum particles.

Figure 1:
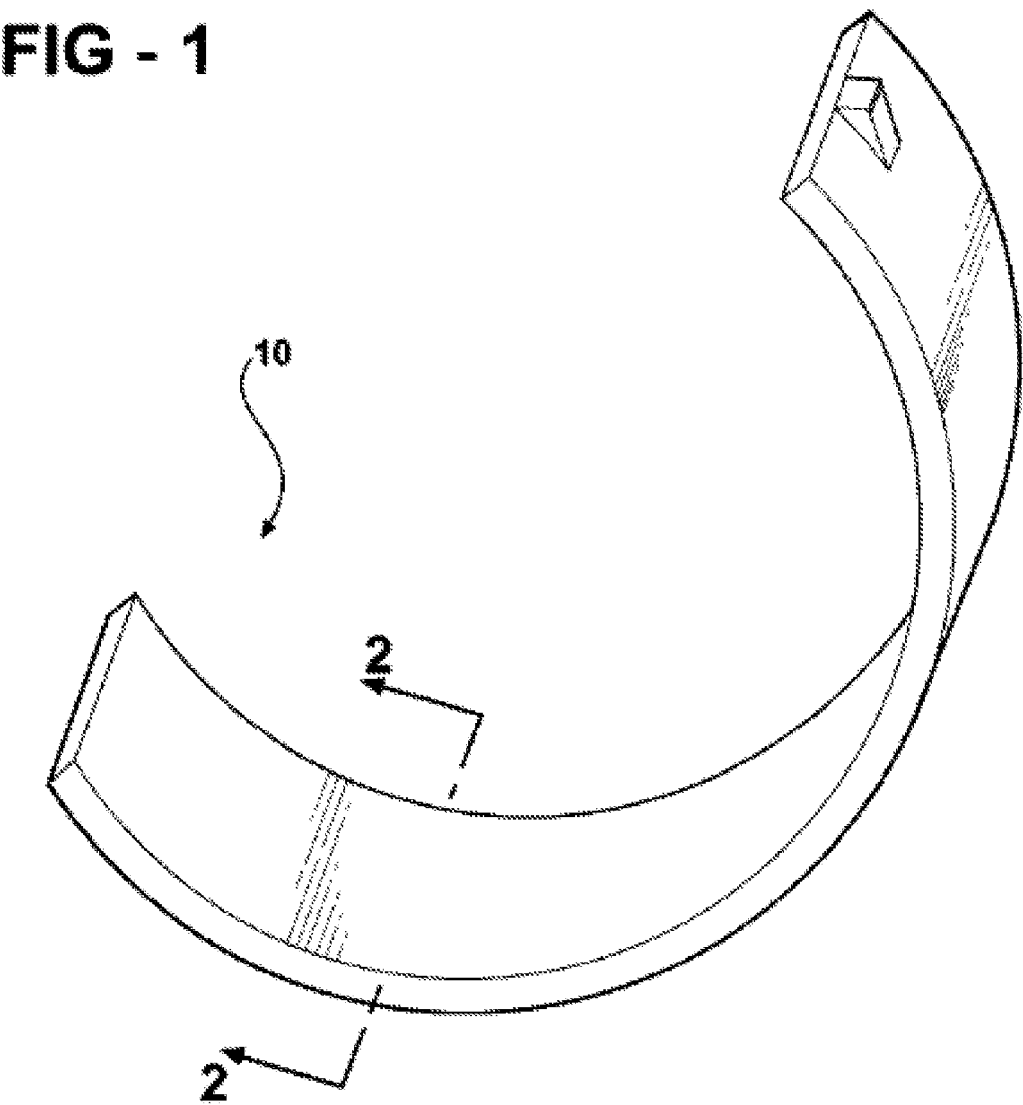
FIG. 1 illustrates an example of a bearing shell according to an example embodiment.
Figure 2:
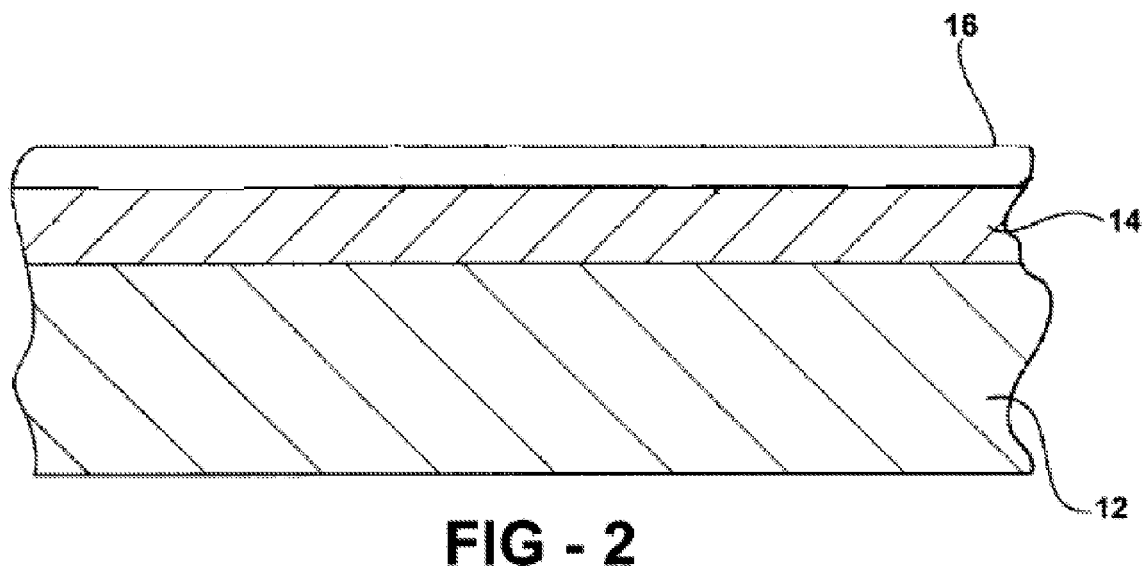
FIG. 2 is a cross-sectional view of the bearing shell of FIG. 1 along line 2-2, showing multiple layers.

As already stated, a bearing shell 10 having an AlSn bearing metal layer 12 is used as the bearing shell. An example of the bearing shell 10 including multiple layers 12, 14, 16 is shown in FIG. 1, and a cross-sectional view of the bearing shell 10 of FIG. 1 along line 2-2 is shown in FIG. 2. The bearing metal layer 16 can contain alloy elements such as Ni, Mn, Si, Cu, Cr, Zr, V or Mg. However, these are not required for the actual effect, i.e. the generation of compressive residual stresses in the surface. The bearing metal layer 16 includes the blasted surface at the concave inner side which faces, during use, the component supported by the bearing shell 10. Typical dimensions of such bearing shells 10 are, for example, a diameter of 60 mm with a bearing width of 20 mm. However, the method can also be used with bearing dimensions deviating from this. In particular, this bearing shell 10 consists of three layers 12, 14, 16, namely of a steel back 12 consisting of approximately 1.2 mm thick steel of C-10 or C-22 type, onto which an intermediate layer 14 of AlCuMgSi and a layer of AlSn-NiMn with a thickness of, for example, 0.15 to 0.3 mm is applied as the bearing metal layer 16 at the concave inner side.

The bearing shell is curved such that the aluminum-tin alloy lies on an inner side, i.e. on a concave side of the bearing shell.

The bearing metal is blasted until it has a hardness of approximately 130 Hv 0.01, while the unblasted bearing metal has a hardness of approximately 115 Hv 0.01. Therefore, the hardness of the bearing metal was increased by approximately 13%. The aforementioned degrees of hardness are Vickers' hardness degrees which are measured in accordance with DIN EN ISO 6507.

In comparison to the state of the art, the blasted plain bearing is characterized by improved fatigue strength and wear properties.

The aforementioned blasting device for bearing shells is a device comprising one or several holders for accommodating one or several bearing shells. Moreover, it comprises at least one blasting device for corundum, with which corundum can be blasted against the bearing shells held in the holders. The aforementioned nozzle forms a part of this blasting device for corundum. As already stated above, an air supply means is connected to the blasting device, however with it also being possible to use any other gas instead of air.

The invention claimed is:

1. A method for treating a bearing shell of a plain bearing, in which the bearing shell is blasted with corundum particles on a concave surface of the bearing shell, wherein the concave surface is at an inner side of the bearing shell, so as to generate compressive residual stresses on the inner side of the bearing shell, wherein the inner side of the bearing shell is compressed by the impact of the corundum particles, the bearing shell further includes an unblasted surface, and the blasted surface has a blast-induced increased hardness that is more than 10% greater than the hardness of the unblasted surface.

2. The method according to claim 1, in which the particles are blasted against the bearing shell at a pressure of between 2.5 and 5 bar.

3. The method according to claim 2, wherein the pressure is between 3 and 4 bar.

4. A method for treating a bearing shell of a plain bearing, in which the bearing shell is blasted with corundum particles on a concave surface of the bearing shell, wherein the concave surface is at an inner side of the bearing shell, so as to generate compressive residual stresses on the inner side of the bearing shell, the inner side of the bearing shell is compressed by the impact of the corundum particles, and wherein an unblasted surface of the bearing shell has a hardness of a maximum of approximately 115 Hv 0.01, while the blasted concave surface of the bearing shell has a hardness of a minimum of approximately 130 Hv 0.01 and/or where the hardness of the blasted concave surface of the bearing shell is locally increased by the blasting by more than 10%, in relation to the unblasted surface of the bearing shell.

5. The method according to claim 4, wherein the increase in hardness is approximately 13%.

6. A method for treating a bearing shell of a plain bearing, in which the bearing shell is blasted with corundum particles on a concave surface of the bearing shell, wherein the concave surface is at an inner side of the bearing shell, so as to generate compressive residual stresses on the inner side of the bearing shell, the inner side of the bearing shell is compressed by the impact of the corundum particles, and the bearing shell has two or more layers including a first layer which includes the blasted concave surface and a second layer formed of steel.

7. The method according to claim 6, in which an aluminum alloy is used as the first layer of the bearing shell and the aluminum alloy is applied onto the second layer by roll cladding.

8. The method according to claim 6, in which the bearing shell consists of three layers including a middle layer between the first layer and the second layer, wherein the middle layer consists of aluminum or an aluminum alloy having the alloy elements Mn, Cu, Ni, Cr, Zr, V, Mg and/or Si.

9. A bearing shell having a blasted surface at an inner concave side of the bearing shell, said inner concave side of said bearing shell having blast-imparted residual stresses and a blast-imparted compressed condition as a result of being blasted with corundum particles, said bearing shell further including an unblasted surface, and said blasted surface having a blast-induced increased hardness that is more than 10% greater than the hardness of said unblasted surface.

10. The bearing shell according to claim 9, wherein said blast-induced increased hardness is approximately 13% greater than the hardness of said unblasted surface.

11. A bearing shell having a blasted surface at an inner concave side of the bearing shell, said inner concave side of said bearing shell having blast-imparted residual stresses and a blast-imparted compressed condition as a result of being blasted with corundum particles, and wherein the bearing shell includes an unblasted surface having a hardness of about 115 Hv0.01, and the blasted surface has a hardness of about 130 Hv 0.01.

\* \* \* \* \*